(12) United States Patent
Koch et al.

(10) Patent No.: US 8,103,041 B2
(45) Date of Patent: Jan. 24, 2012

(54) SPEAKER RETENTION BRACKET

(75) Inventors: Jeff Koch, Farmington Hills, MI (US);
Hiroshi Iwasaki, Farmington, MI (US)

(73) Assignee: Nissan North America, Inc., Franklin, TN (US)

( * ) Notice: Subject to any disclaimer, the term of this patent is extended or adjusted under 35 U.S.C. 154(b) by 1257 days.

(21) Appl. No.: 11/763,774

(22) Filed: Jun. 15, 2007

(65) Prior Publication Data

US 2008/0310668 A1    Dec. 18, 2008

(51) Int. Cl.
*H04R 1/02* (2006.01)
(52) U.S. Cl. .................................... 381/386; 381/389
(58) Field of Classification Search .............. 181/150; 381/86, 87, 302, 386, 389
See application file for complete search history.

(56) References Cited

U.S. PATENT DOCUMENTS

| | | | |
|---|---|---|---|
| 4,815,558 A | | 3/1989 | Krainhofer |
| 4,993,510 A | * | 2/1991 | Kato et al. ................. 381/86 |
| 4,997,059 A | | 3/1991 | See |
| 5,416,283 A | | 5/1995 | Dault et al. |
| 5,727,077 A | | 3/1998 | Frasl |
| 7,167,573 B2 | | 1/2007 | Williamson |
| 7,177,438 B2 | * | 2/2007 | Iwaya et al. ................. 381/87 |
| 2005/0072891 A1 | | 4/2005 | Wright |

FOREIGN PATENT DOCUMENTS

| | | |
|---|---|---|
| EP | 1460877 | 9/2004 |
| JP | 879348 | 3/1996 |
| JP | 2001169374 | 6/2001 |
| WO | WO9011667 | 10/1990 |

* cited by examiner

*Primary Examiner* — Brian Ensey
(74) *Attorney, Agent, or Firm* — Young Basile Hanlon & MacFarlane, PC

(57) ABSTRACT

An audio speaker bracket for use in passenger vehicles and a method for installing the speaker to a mounting panel using at least one suspension member. The method permits the speaker to be temporarily supported by a mounting panel while secure attachment of the bracket to the mounting panel is completed.

20 Claims, 3 Drawing Sheets

SPEAKER RETENTION BRACKET

FIELD OF THE INVENTION

The speaker bracket and method of the present invention generally pertain to installing audio speakers in automobiles and more particularly to audio speakers mounted under passenger vehicle rear package trays.

BACKGROUND

Audio speakers have long been mounted to conceal the speaker from view in the passenger compartment. Speakers have been mounted behind instrument panels, door trim panels and trim panels adjacent a rear seat. A popular mounting position for large speakers is underneath the horizontal package tray behind the rear seat and adjacent the rear window to take acoustic advantage of the enclosed trunk space.

Typically, audio speakers include an integral metal frame including two or more flanges permitting the speaker to be screwed or bolted to nearby sheet metal vehicle structure placing the open part of the speaker cone adjacent to, or flush with, the trim panel. A speaker grille is then placed over the hole in the trim panel to conceal the speaker cone and protect the speaker from damage by the occupants and from parcels or other debris.

Alternatively, a speaker bracket which is separate from the speaker may be used to position and secure the speaker to the vehicle supporting structure, for example, where suitable integrated attachment flanges cannot be incorporated with the speaker. These brackets may be attached at the time the speaker is installed or come pre-assembled with the speaker at the point of installation.

Recent developments on the installation of speakers have included integrated attachment clips or other types of integrated fastening schemes to eliminate separate mechanical fasteners such as screws, bolts or attachment clips. These integrated fastening systems coordinate with adjoining vehicle structure to frictionally or lockingly engage the speaker to the vehicle structure. These attaching systems were designed to eliminate the need for separate fasteners which, in theory, reduced the number of vehicle parts and reduced installation time. These systems have found to not work well in certain applications where large, heavy audio speakers are used.

A particularly difficult area in which to install audio speakers is in the package tray area which is typically a substantially horizontal panel behind the rear seat partially covering the trunk compartment. In this area, particularly in sedan-type vehicles, the back window of the vehicle is positioned at a fairly low angle with respect to the package tray. This small angle between the package tray and the rear window makes it difficult to efficiently align the mounting holes in the tray with the speaker attachment holes and drive the mechanical fasteners down through the package tray into the speaker frame or speaker bracket. Prior to securing the speaker, it is further challenging to position the speaker on the underside of the packaging tray which is typically deep inside the trunk compartment. The difficult ergonomics and relatively heavy speakers make it difficult for installers to position, align and hold the heavy speakers in place until they are secured to the package tray. In this application, it is typically necessary for one installer to hold the speaker in place and a second installer to align and drive the fasteners to secure the speaker. Often two speakers are installed which takes a considerable amount of physical effort and installation time.

Adding to this challenge is the ever-growing demand for higher quality audio systems which include large, oversized speakers having heavier magnets thereby greatly increasing the weight of the speakers and burdens to install them.

It would therefore be advantageous to design a speaker and/or bracket and method of installation which improves on these disadvantages in prior designs and installation techniques.

SUMMARY

The present invention includes a method for installing a speaker to a mounting panel in a vehicle. The method includes providing a speaker having at least one suspension member. The speaker is positioned with respect to a mounting panel whereby the suspension member engages the mounting panel thereby temporarily suspending the speaker from the mounting panel until the speaker is securely attached to the mounting panel.

In a preferred aspect of the invention, a speaker bracket attaches to the speaker. The bracket includes two suspension members which protrude outwardly from the speaker bracket and are positioned through the underside of the mounting panel. The bracket is rotated in a clockwise direction such that the suspension members engage the mounting panel and temporarily suspend the speaker from the mounting panel until mechanical fasteners are driven down through the mounting panel into attaching bosses in the speaker bracket.

In an alternate aspect, on rotation of the bracket with respect to the mounting panel, mounting holes in the mounting panel become aligned with the attaching bosses on the speaker bracket thereby facilitating easy insertion of mechanical fasteners through the mounting panel for secure threading engagement with the mounting bracket.

In a preferred speaker bracket, the speaker bracket includes a housing, a first surface and a second surface separated by a sidewall. The housing defines a speaker opening in the first surface of the housing. The housing further defines an acoustic opening in the second surface adjacent the speaker cone for transmission of sound waves through the acoustic opening. The bracket includes two attaching bosses for attaching the speaker to the bracket and two second attaching bosses for attachment of the bracket and speaker assembly to the mounting panel as previously described. The bracket also includes at least one suspension member for engagement with the mounting panel to temporarily suspend the bracket and speaker assembly until the assembly is secured to the mounting panel.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Referring to FIGS. 1-7A, a speaker bracket and method for installation of a speaker is illustrated and described below. Referring to FIGS. 1-4, a speaker bracket 10 in an exemplary application includes a speaker 12 (shown in phantom) attached to the bracket 10 which is mounted to the underside of a package tray or mounting panel 14 (shown in phantom).

Figure 1:
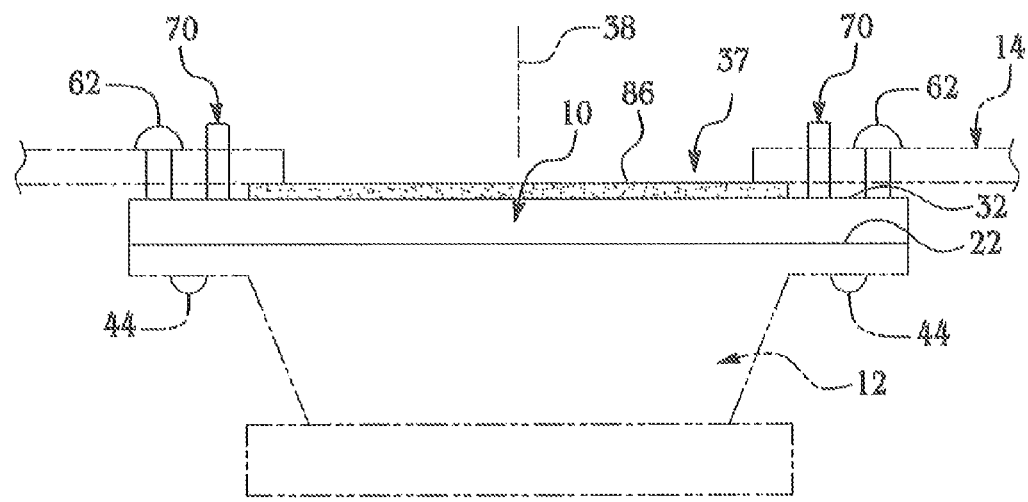
FIG. 1 is a schematic sectional view of a preferred speaker bracket illustrating a speaker attached to the bracket and the bracket and speaker assembly attached to the underside of a mounting panel package tray.
Figure 2:
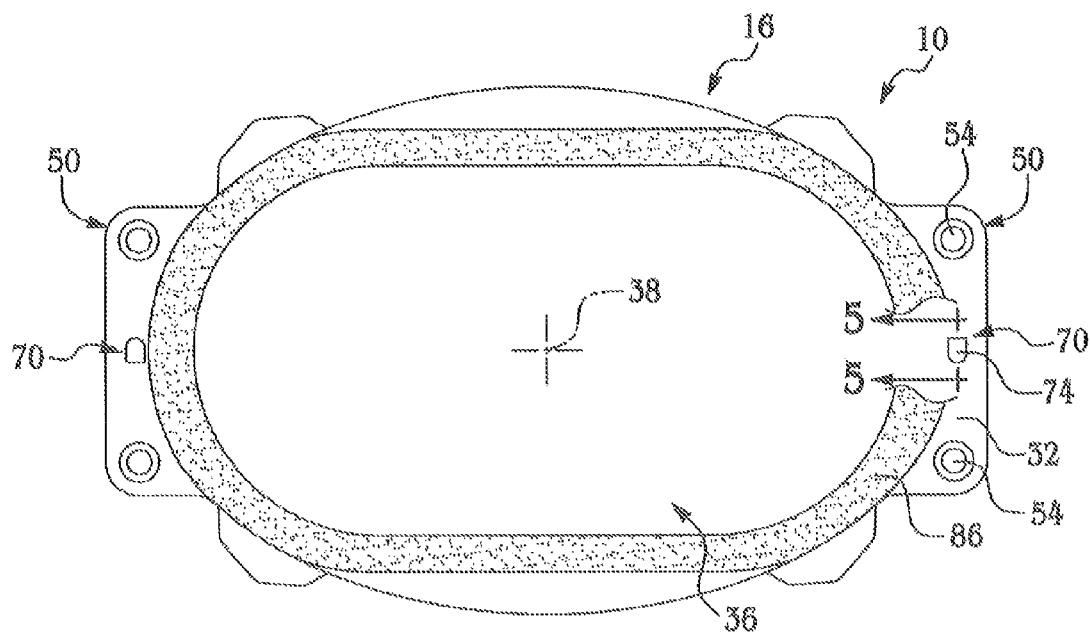
FIG. 2 is a top view of a preferred embodiment of the bracket.
Figure 3:
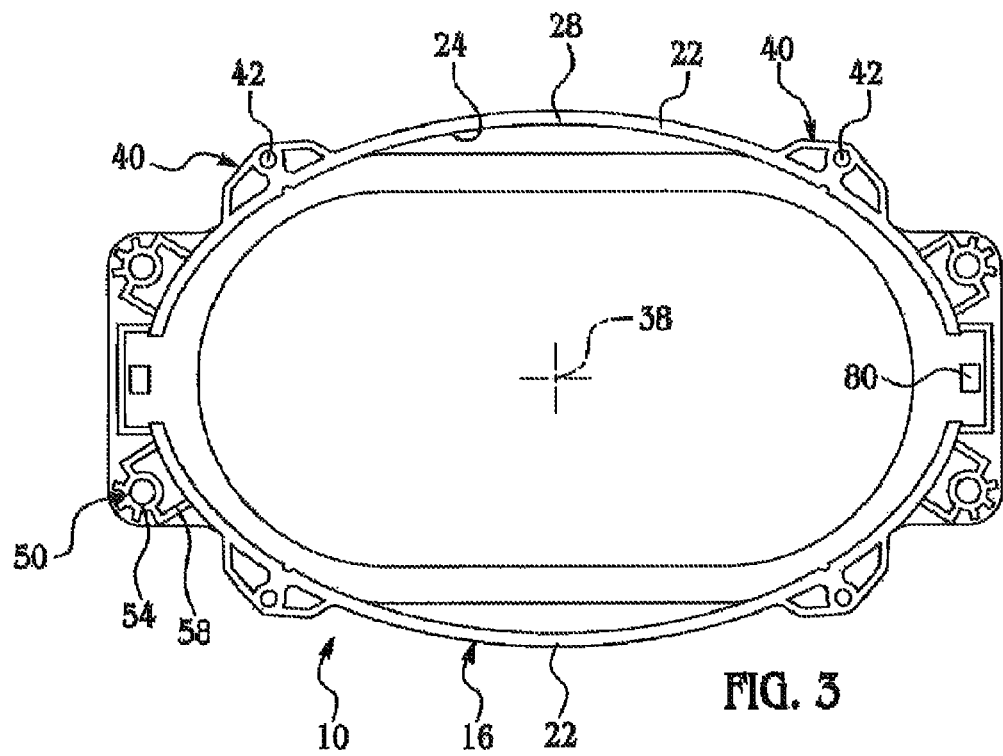
FIG. 3 is a bottom view of the preferred bracket.
Figure 4:
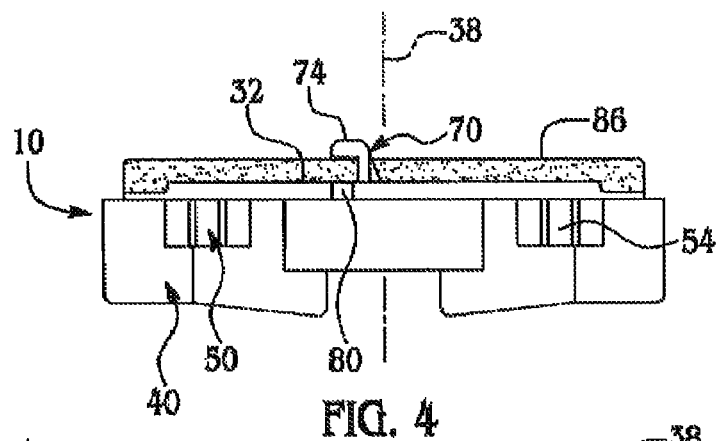
FIG. 4 is right side view of the preferred bracket.

Referring to FIGS. 2-4, speaker bracket 10 includes a housing 16 having a first surface 22 on the underside of bracket 10. First surface 22 defines a speaker opening 24 for receipt of, or for abutting engagement with, speaker 12. In a preferred aspect, housing 16 includes an oval-shaped sidewall 28 and second surface 32 an the top or upper portion of bracket 10 adjacent to a substantially horizontal mounting panel 14 as shown in FIG. 1. Bracket 10 can be made from a molded polymer, a cast or stamped ferrous or non-ferrous metal or other material or processes known by those skilled in the art.

Second surface 32 defines an acoustic opening 36. In a preferred aspect, acoustic opening 36 is smaller in diameter than speaker opening 24 to allow for a larger speaker 12 to be mounted to bracket 10 while permitting a smaller mounting panel opening 37 as best seen in FIG. 1. Acoustic opening 36 is oval-shaped about a longitudinal axis 38 which extends substantially perpendicular to speaker opening 24 and acoustic opening 36 and substantially vertical in an exemplary installation in a passenger vehicle.

As best seen in FIG. 3, housing 16 includes at least two attaching bosses 40 (four shown). In a preferred aspect, the first attaching bosses 40 each include an attaching hole 42 for receipt of a clip or a mechanical fastener for mounting of the speaker 12 to the bottom of bracket 10 as been seen in FIG. 1. First attaching bosses 40 and attachment holes 42 may take any suitable form for secure attachment of speaker 12 to bracket 10. In an alternate aspect, first attachment bosses 40 may include threaded inserts (not shown) molded into first attachment bosses 40 for threaded receipt of mechanical fasteners such as a bolt (not shown) or other fastening clips or means of attachment known by those skilled in the art.

As best seen in FIGS. 2 and 3, bracket 10 further includes second attaching bosses 50 (four shown) positioned on second surface 32 and are used to attach bracket 10 to mounting panel 14. In a preferred aspect, each second attaching boss 50 includes a threaded insert 54 molded into, or press fit into, bosses 50 and reinforcing ribs 58 for receipt of a threaded fastener 62 as best seen in FIG. 1. In an alternate aspect, second attachment bosses 50 can take the form of a molded hole similar to that shown for first attachment bosses 40 or may include other structure or means for attachment of the speaker bracket 10 to a mounting panel 14 to suit the particular application. In a preferred aspect, second attachment bosses 50 are planar with second surface 32 to provide for flush mounting of speaker bracket 10 to mounting panel 14 although other forms may be used to suit the particular application or installation environment.

As best seen in FIG. 4, bracket 10 further includes at least one suspension member 70 extending outwardly from first surface 32 substantially along the longitudinal axis 38. In a preferred aspect, suspension member 70 includes a tab 74 extending in a circumferential direction about longitudinal axis 38 and more preferably in a clockwise direction about longitudinal axis 38 as viewed from above second surface 32. In a preferred aspect, two suspension members 70 are positioned diametrically across acoustic opening 36 as best seen in FIG. 2.

Figure 5:
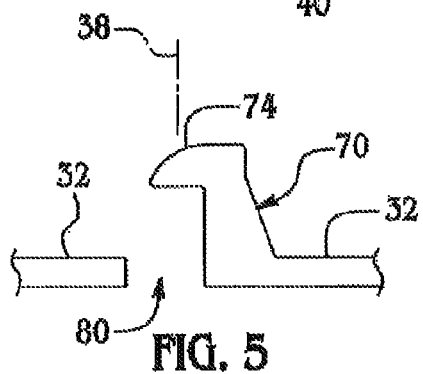
FIG. 5 is a partial sectional view taken along line A-A in FIG. 2.
Figure 6:
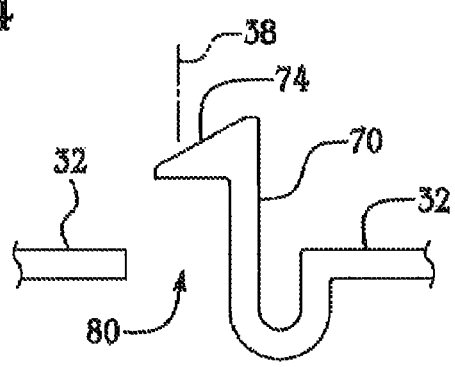
FIG. 6 is an alternate embodiment of FIG. 5.

In a preferred aspect, suspension member 70, and more specifically tab 74, is positioned above a tooling hole 80 molded into second surface 32 to provide for ease of molding suspension member 70 without the need for slides in the manufacturing molding tool as best seen in FIG. 5. As best seen in FIG. 6, alternate forms of suspension member 70 and tab 74 may be used to suit the particular application without deviating from the present invention. The alternate aspect in FIG. 6 provides for increased flexibility and movement of suspension member 70 to assist in the installation of bracket 10 to mounting panel 14 as described later. It is understood that less than, or more than, two suspension members 70 may be used and positioned in different locations. For example, it is contemplated that the suspension member could be integrated into the mounting panel and a receptacle or other receiving member or structure be on the bracket 10 or speaker 12 to engage and suspend the speaker 12 as described.

Figure 7:
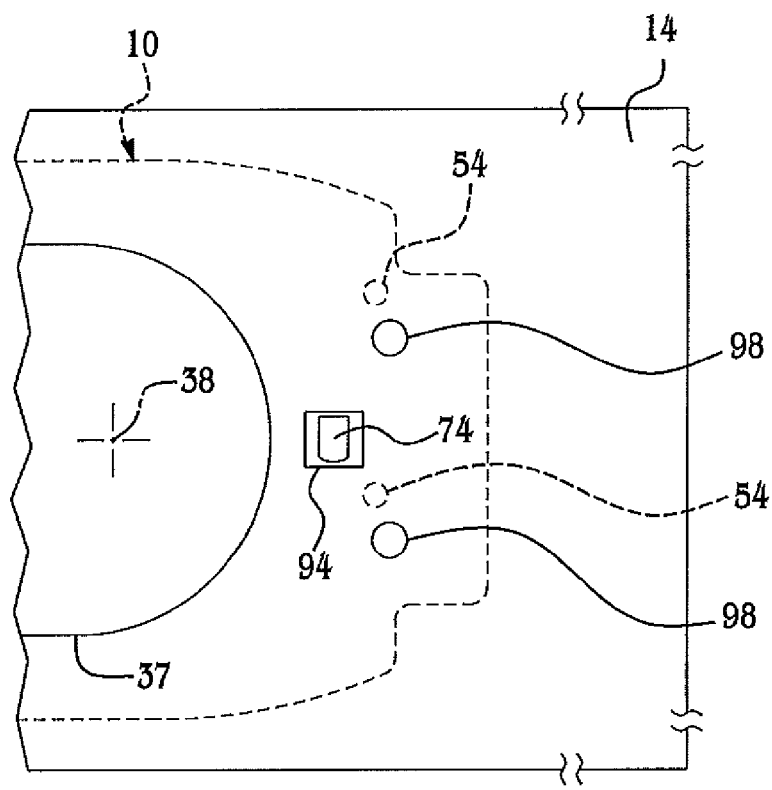
FIG. 7 is a schematic top view of the speaker bracket installed on the underside of a mounting panel package tray.
Figure 7A:
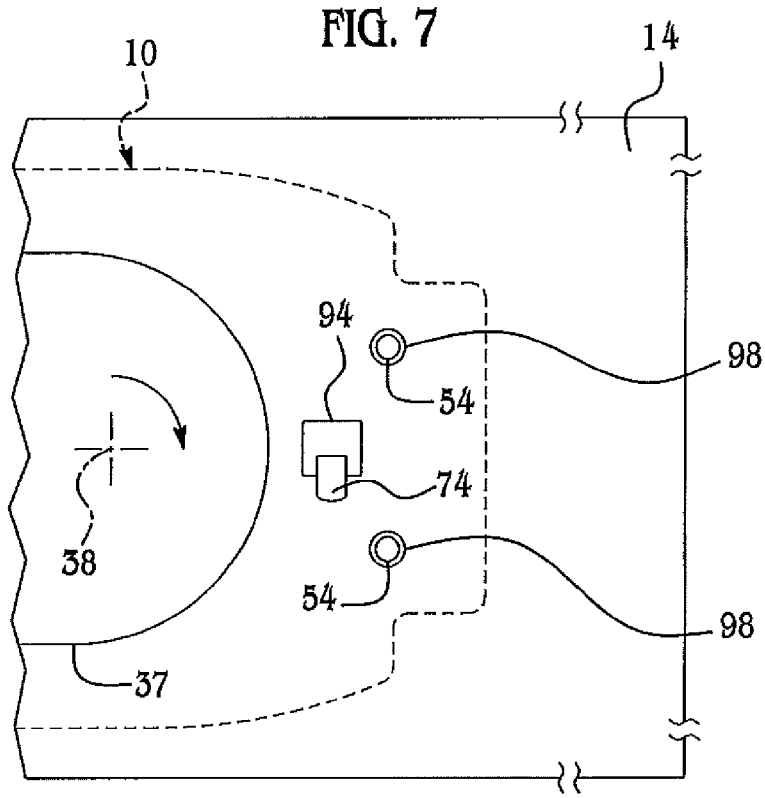
FIG. 7A is the bracket as shown in FIG. 7 in an installed position whereby the bracket is suspended from the underside of the mounting panel package tray.

As best seen in FIGS. 7 and 7A, suspension member 70 and tab 74 are preferably positioned on bracket 10 in radial and circumferential alignment with positioning holes 94 in mounting panel 14. As further shown in FIG. 7A, second attaching bosses 50 threaded inserts 54 are further positioned in radial and circumferential alignment with coordinating attachment holes 98 in mounting panel 14.

Bracket 10 further includes a seal 86 positioned on second surface 32 surrounding die perimeter of acoustic opening 36. Seal 86 is preferably an adhesive-backed, open-cell compressible foam. As best seen in sectional view FIG. 1, on installation, seal 86 is compressed between second surface 32 and mounting panel 14 to seal out debris, enhance acoustic characteristics and prevent rattling (enlarged space between 14 and 32 shown for ease of illustration). It is understood that other foams or materials known by those skilled in the art may be used without deviating from the present invention.

In a preferred method of installation, a speaker bracket 10 is provided having at least one first attaching boss 40 for attachment of speaker 12 to bracket 10. In a preferred aspect, four attaching bosses 40 are used and fasteners 44 are driven through a flange or other frame support in speaker 12 into bosses 40.

Bracket 10 is further provided with at least one suspension member 70 for engagement with mounting panel 14 to temporarily attach bracket 10 to mounting panel 14 thereby suspending bracket 10 and speaker 12 from mounting panel 14 as further described later. As explained above, bracket 10 preferably includes two suspension members 70 including tabs 74 circumferentially positioned in a clockwise direction about longitudinal axis 38 as viewed from second surface 32.

On attachment of speaker 12 to bracket 10 by exemplary fasteners 44, speaker bracket 10 is positioned directly underneath mounting panel 14 such that the acoustic opening 36 in bracket 10 is concentrically aligned with acoustic opening 37 in mounting panel 14 either by an installer reaching into the trunk compartment or by a mechanical installation device such as a robot arm. Bracket 10 is positioned such that suspension members 70 are in axial alignment with mounting panel positioning holes 94 as best seen in FIGS. 1 and 7. Bracket 10 is then moved in an axial direction along longitudinal axis 38 until the bottom portions of tabs 74 pass through positioning holes 94 as best seen in FIG. 7. In this first circumferential position, threaded inserts 54 in second attachment bosses 50 are not in circumferential alignment with mounting panel attachment holes 98 as best seen in FIG. 7. As best seen in comparing FIGS. 7 and 7A, in a preferred method of installation, bracket 10 and speaker 12 are rotated in a clockwise direction about longitudinal axis 38 to a second circumferential position until suspension members 70 contact the perimeter of positioning holes 94 preventing further clockwise rotation of bracket 10 with respect to mounting panel 14. As best seen in FIG. 7A, in this position, tabs 74 extend beyond hole 94 over mounting panel 14 and threaded inserts 54 are in circumferential and axial alignment with attachment holes 98.

At this point of the bracket 10 installation, an installer may release manual support of bracket 10 and speaker 12. The weight of bracket 10 and speaker 12 is supported in the axial direction along longitudinal axis 38 requiring no further support by an installer or mechanical installation device. This suspending of bracket 10 and speaker 12 by mounting panel 14 through suspension members 70 thereby relieves an installer from the typically awkward ergonomic position and frees the installer to complete the securement of bracket 10 and speaker 12 to mounting panel 14.

In a preferred installation method, fasteners 62 are inserted through attachment holes 98 in mounting panel 14 and are threadingly engaged with threaded inserts 54 in bracket 10 to fully secure bracket 10 and speaker 12 to mounting panel 14 as best seen in FIG. 1. On the application of torque on fasteners 62, the bracket 10 is biased in a clockwise direction such that suspension members 70 further engage mounting panel 10. It is understood that other fasteners 62 or other fastening means, such as clips, tabs or other forms of fasteners may be used without deviating from the present invention.

A speaker grille of other cover (not shown) may be installed over mounting panel opening 37 to protect the speaker 12 from damage or debris, while preserving the acoustic characteristics of the speaker 12.

Although installation of bracket 10 and speaker 12 has been disclosed as being installed on the underside of a substantially horizontal mounting panel package tray 14, it is understood that the bracket 10 may be installed on other panels in different orientations as that illustrated and described. It is further understood that the features of the bracket, including attaching bosses and suspension members 70, may be integral with speakers 12 or mounting panel 14 thus eliminating bracket 10.

While the invention has been described in connection with what is presently considered to be the most practical and preferred embodiment, if is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A speaker bracket for aligning and fastening a speaker to a mounting panel for installation in a vehicle, the bracket comprising:
   a housing having a first surface and a second surface separated by a sidewall, the housing defining an acoustic opening in the second surface having a longitudinal axis and further defining a speaker opening in the first surface;
   at least two first attaching bosses positioned adjacent the first surface for attachment of the speaker to the bracket;
   at least two second attaching bosses adjacent the second surface for attaching the bracket to the mounting panel in the vehicle; and
   at least one suspension member extending axially outward from the second surface along the longitudinal axis, the member further having a tab extending from the member in a circumferential direction about the longitudinal axis for circumferentially aligning the second mounting bosses with the mounting panel and axially suspending the bracket from the mounting panel until the bracket is securely fastened to the mounting panel.

2. The bracket of claim 1 wherein the tab is positioned in a clockwise direction about the longitudinal axis.

3. The bracket of claim 1 further comprising at least two fasteners independent from the bracket and the mounting panel for attaching the bracket to the mounting panel.

4. The bracket of claim 3 wherein the at least two fasteners are positioned through the mounting panel and engaged with the second attachment bosses.

5. The bracket of claim 1 wherein the acoustic opening is radially smaller than the speaker opening to receive a speaker larger than the acoustic opening.

6. The bracket of claim 1 wherein the mounting panel is a rear package shelf of a vehicle and the bracket is attached to an underside of the panel.

7. A speaker bracket for aligning and fastening a speaker to a mounting panel for installation in a vehicle, the bracket comprising:
   a housing having a first surface and a second surface separated by a sidewall, the housing defining an acoustic opening in the second surface and further defining a speaker opening in the first surface;
   at least one speaker attachment boss for attachment of the speaker to the bracket;
   at least one panel attachment boss for attaching the bracket to the mounting panel in the vehicle; and
   at least one suspension member extending from the second surface, the suspension member having a tab configured and arranged to suspend the bracket from the mounting panel until the bracket is securely fastened to the mounting panel.

8. The bracket of claim 7 wherein the at least one suspension member extends axially outward from the second surface with respect to a longitudinal axis of the housing, and the tab extends in a circumferential direction with respect to the longitudinal axis.

9. The bracket of claim 7 further comprising at least one fastener independent from the bracket and the mounting panel for attaching the bracket to the mounting panel.

10. The bracket of claim 9 wherein the at least one fastener is positioned through the mounting panel and engaged with the at least one panel attachment boss.

11. The bracket of claim 7 wherein the acoustic opening is radially smaller than the speaker opening to receive a speaker larger than the acoustic opening.

12. The bracket of claim 7 wherein the mounting panel is a rear package shelf of a vehicle and the bracket is attached to an underside of the panel.

13. The bracket of claim 8 wherein the tab is positioned in a clockwise direction about the longitudinal axis.

14. A speaker mounting assembly comprising:
   a mounting panel defining a first acoustic opening, at least one fastener aperture, and at least one positioning aperture;

a speaker; and a speaker attachment bracket comprising:

a housing having a first surface and a second surface separated by a sidewall, the housing defining a second acoustic opening in the second surface and further defining a speaker opening in the first surface;

at least one speaker attachment boss for attachment of the speaker to the bracket;

at least one panel attachment boss for attaching the bracket to the mounting panel in the vehicle; and at least one suspension member extending from the second surface, the suspension member having a tab positioned within the positioning aperture to suspend the bracket from the mounting panel until the bracket is securely fastened to the mounting panel;

wherein the at least one panel attachment boss is unaligned with the at least one fastener aperture, and the tab is disengaged from the mounting panel with the speaker attachment bracket in a uninstalled position; and the at least one panel attachment boss is aligned with the at least one fastener aperture, the second acoustic opening is aligned with the first acoustic opening, and the tab is engaged with the mounting panel with the speaker attachment bracket in an installed position.

15. The bracket of claim 14 wherein the at least one suspension member extends axially outward from the second surface with respect to a longitudinal axis of the housing, and the tab extends in a circumferential direction with respect to the longitudinal axis.

16. The bracket of claim 14 further comprising at least one fastener independent from the bracket and the mounting panel for attaching the bracket to the mounting panel.

17. The bracket of claim 16 wherein the at least one fastener is positioned through the mounting panel and engaged with the at least one panel attachment boss.

18. The bracket of claim 14 wherein the acoustic opening is radially smaller than the speaker opening to receive the speaker that is larger than the acoustic opening.

19. The bracket of claim 14 wherein the mounting panel is a rear package shelf of a vehicle and the bracket is attached to an underside of the panel.

20. The bracket of claim 15 wherein the tab is positioned in a clockwise direction about the longitudinal axis.

* * * * *